United States Patent
Wada

Patent Number: 5,861,907
Date of Patent: Jan. 19, 1999

[54] MULTI-POINT TELECONFERENCE SYSTEM

[75] Inventor: Yoshiyasu Wada, Tokyo, Japan

[73] Assignee: NEC Corporation, Tokyo, Japan

[21] Appl. No.: 3,889

[22] Filed: Jan. 7, 1998

[30] Foreign Application Priority Data

Jan. 14, 1997 [JP] Japan .................................. 9-004858

[51] Int. Cl.$^6$ ........................................................ H04N 7/14
[52] U.S. Cl. .............................. 348/15; 348/14; 379/93.21
[58] Field of Search ................................... 348/14, 15, 16, 348/17, 18; 370/260, 261; 379/202

[56] References Cited

FOREIGN PATENT DOCUMENTS 4-298146 10/1992 Japan .
5-83407 4/1993 Japan .
5-327913 12/1993 Japan .

Primary Examiner—Curtis A. Kuntz
Assistant Examiner—Melur Ramakrishnaiah
Attorney, Agent, or Firm—Sughrue, Mion, Zinn, Macpeak & Seas, PLLC

[57] ABSTRACT

When a teleconference among more than two places is performed using a multi-point teleconference system, each of teleconference terminal units makes a connection to a multi-point control unit by line. When the number of participants in the teleconference reduces during the teleconference so that the teleconference is performed between only two places, a conference state managing section requests the two teleconference terminal units to make a point-to-point-connection. When the point-to-point connection is acknowledge by these teleconference terminal units, the teleconference by the multi-point control unit is finished. Thereafter, the line is automatically connected between the two teleconference terminal units to perform a teleconference in the style of the point-to-point connection, so that a fee paid for use of the line is one-half compared with that in the case of the prior art.

5 Claims, 6 Drawing Sheets

MULTI-POINT TELECONFERENCE SYSTEM

BACKGROUND OF THE INVENTION

1. Field of the Invention

The present invention relates to a multi-point teleconference system for performing a conference among a plurality of places using televisions, more particularly to a multi-point teleconference system which is effectively used in case where the number of the conference places is changed to two points to continue the teleconference on the way during the teleconference connecting more than two points.

2. Description of the Related Art

The multi-point teleconference system which is participated by persons existing in a plurality of places using televisions has become of major interest lately. This system is designed such that image data from each participant for the conference existing in different places is input by a television camera and voice information therefrom is input by a microphone (hereinafter referred to as mike), thereby outputting an image and voice of a speaker and the like from the television disposed in respective places.

FIG. 1 shows an example of such kind of the conventional multi-point teleconference system which is disclosed in Japanese Patent Application Laid Open Nos. 83407/93, 298146/92, and 327913/93, for example. In this multi-point teleconference system, teleconference terminal units $111_1$ to $111_N$ arranged in respective places and a multi-point control unit 112 arranged in one place in the system are connected by means of an ISDN (Integrated Services Digital Network) public line 113.

In the foregoing structure of the conventional multi-point teleconference system, each of the teleconference terminal units $111_1$ to $111_N$ comprises a television (not shown) which outputs an image and a voice, a television camera (not shown) which inputs an image, a microphone (not shown) which inputs a voice, and control processing section (not shown) which controls these input/output equipment. Moreover, the multi-point control unit 112 comprises a circuit which puts voice signals sent from each of the teleconference terminal units $111_1$ to $111_N$ together to transmit the addition result to each of the teleconference terminal units $111_1$ to $111_N$, and a circuit which transmits a specified video signal among the video signals sent from each of the teleconference terminal units $111_1$ to $111_N$ to them. For example, this circuit checks the voice signal sent from each of the teleconference terminal units $111_1$ to $111_N$ and selects an image of the conference terminal unit exhibiting a level of the voice signal exceeding a reference value as the one of the speaking teleconference terminal unit, and transmits the selected image to each of the teleconference terminal units $111_1$ to $111_N$.

In such a multi-point teleconference system, each of the teleconference terminal units $111_1$ to $111_N$ which participates in the conference sends an ISDN number of the multi-point control unit 112 to the ISDN public line 113 to make a connection thereto and performs the teleconferences therebetween. In this case, the multi-point teleconference is often scheduled to be carried out by connecting more than two places such as three places and five places. However, actually, in the case where a period of time of the conference is prolonged, a situation where a conference room used for that conference must be used for other conference may occur. Otherwise, a situation where some participants retire from the conference may also occur. These cases lead to a reduction in the number of the participants. As a result, carrying out of the teleconference by connecting two places is not rare.

In the foregoing multi-point teleconference system, there has been the following drawback. Specifically, even when the number of the places connected to the multi-point control unit 112 becomes two and the participants in the conference in these two places still continue it, participants in both places must pay connection fee of the line. This is because the fee for the time during the teleconference must be paid by the teleconference terminal unit on the sending side and both terminals have been connecting to the ISDN public line 113 by sending the ISDN number of the multi-point control unit 112. As a result, even when the number of the places where the participants exist becomes two, a cost will be twice as high as that at the case when the conference is performed simply by connecting two places so that an economical problem occurs. For this reason, at a time of point when the number of places where the participants become two, a method has been adopted, in which the teleconference is once interrupted and one teleconference terminal unit dials the ISDN number of the other teleconference terminal unit, thereby connecting both of the terminal units.

FIG. 2 is a flow chart showing switching control of line connections on the side of the multi-point control unit 112 of the conventional multi-point teleconference system. When the multi-point teleconference starts by a sending operation of a plurality of teleconference terminal units $111_1$ to $111_N$ (step S101; Yes), at this point of time, the multi-point control unit 112 investigates the number of places which participate in the conference (step S102). The number of the places is found at this point of time by investigating how many times the teleconference terminal units $111_1$ to $111_N$ have performed the line connection by sending the ISDN number to the multi-point control unit 112 for the conference. As a result of the investigation, when the teleconference terminal units $111_1$ to $111_N$ more than two make the line connections to the multi-point control unit 112 (step S103; Yes), the teleconference by means of multi-point teleconference system starts (step S104).

Unless the participants in any places retire from the conference (step S105; No), the teleconference by the multi-point connections is continued (step S104). If retirement of the participants from the conference occurs (step S105; Yes), it is checked whether the number of remaining places where the participants exist is more than two (step S103). It is possible to investigate the present number of the participants in the conference based on the number of voice data collected from the teleconference terminal units $111_1$ to $111_N$ to the multi-point control unit 112. When the present number of the participants in the conference is more than two (Yes), the step returns to S104 so that the teleconference by the multi-point connections is continued.

On the contrary, when the number of the places where the participants exist is reduced by any retirement to two (step S103; No), the participants in each place are allowed to confirm by looking at an image display whether switching to a point to point (referred to as P—P) connection is necessary (step S106). In the case where the multi-point teleconference is admitted since a person who retired from the conference is scheduled to return thereto or the conference is to be completed soon (step S107; No), the step returns to S104, so that the teleconference by the multi-point connections is continued.

On the other hand, when the switching to the P—P connection is required (Yes), the multi-point control unit 112 displays the ISDN number of the other station on the display for two places which are performing the conference for the present (step S108). The ISDN number of the other station may be informed only to one place which requires the switching to the P—P connection or only to the predetermined one place. Thereafter, the teleconference by the multi-point connection is completed and all of the lines connecting the participating places are disconnected (step S109).

Therefore, after that, the persons wishing to continue the teleconference perform sending operation of the ISDN number and connect the line between the finally remaining two places, whereby the teleconference by the P—P connection is performed. In the case of the teleconference by the multi-point connection, two participants of the conference on both sides are charged for payment. However, in the case of the teleconference by the P—P connection, the participant on one side will be charged for payment. As a result, the fee paid for the usage of the line will be reduced to a half in total.

In the conventional multi-point teleconference system, when the teleconference by the multi-point connection is switched to that by the two places connection, the lines must be once disconnected. Moreover, the remaining users must restart the teleconference by performing the P—P connection so that the procedure has been taken much time for the users; therefore, even when the multi-points where the teleconference is performed are reduced to two places, the teleconference by the multi-point connection tends to be continued. In this case, there has been a problem that the fee for the television connection by the multi-point connection is twice as high as the teleconference by the P—P connection because in the teleconference by the multi-point connection, the fee is charged for the participants on both sides. Moreover, when the teleconference by the multi-point connection is continued under these circumstances, the multi-point control unit 112 occupied by these two places during this period of time, resulting in a problem that other conferences can not be held with the multi-point control unit 112.

SUMMARY OF THE INVENTION

The object of the present invention is to provide a multi-point teleconference system which is capable of realizing a teleconference without imposing an economically excessive burden and an extra time on participants in the conference even when the number of participants in the conference reduces during the conference.

Another object of the present invention is to provide a multi-point teleconference system which is capable of releasing a multi-point control unit from controlling a teleconference at the time when the number of places participating in the teleconference is changed from more than two to two.

In order to achieve the foregoing objects, a multi-point teleconference system of the first aspect of the present invention comprises (a) teleconference opening means for connecting each of a plurality of teleconference terminal units to a multi-point control unit by lines, thereby opening a conference using televisions among these teleconference terminal units, the multi-point control unit receiving voices and images of a plurality of participants in the conference and supplying the voices and the images required for the participants in the conference to them; (b) number decision means for detecting a temporal change of the number of the teleconference terminal units participating in the opened teleconference; and (c) teleconference style changing means for allowing two teleconference terminal units to perform the teleconference by automatically making a direct connection between the two teleconference terminal units without interposing the multi-point control unit when the number of the teleconference terminal units detected by number decision means becomes two.

Specifically, in the multi-point teleconference system of the first aspect of the present invention, each of the teleconference terminal units is individually connected to the multi-point control unit by the line, whereby the teleconference is begun. The temporal change of the number of the teleconference terminal units participating in the conference is checked by number decision means, and the remaining two teleconference terminal units are automatically connected with the line, after once disconnected, by the teleconference style changing means without interposing the multi-point control unit when the number of the teleconference terminal units becomes two, whereby each of the two teleconference terminal units need not to pay a fee for use of the line individually.

A multi-point teleconference system of the second aspect of the present invention is characterized in that the teleconference style changing means in the multi-point teleconference system of the first aspect of the present invention comprises point-to-point connection request means for requesting the two teleconference terminal units to perform the teleconference therebetween by directly connecting them with the line by means of a point-to-point connection when the checked number by the number decision means becomes two, whereby it is sufficient that only one teleconference terminal unit pays for the use of the line by allowing this request.

A multi-point teleconference system of the third aspect of the present invention is characterized in that the point-to-point connection request means of the multi-point teleconference system of the second aspect of the present invention informs at least one of the two teleconference terminal units of a phone number of the other teleconference terminal unit, the phone number being necessary when a point-to-point-connection is made, whereby the teleconference terminal unit informed of the phone number will be able to automatically call to the other teleconference terminal unit participating in the conference.

A multi-point teleconference system of the fourth aspect of the present invention is characterized in that the point-to-point request means of the multi-point teleconference system of the third aspect of the present invention comprises circuit disconnection means for disconnecting the lines between the two teleconference terminal units and the multi-point control unit when both of the two teleconference terminal units have acknowledged the point-to-point connection, after the point-to-point connection request means requested the point-to-point connection. This implies that conveniences of the teleconference terminal units which continue the conference are given priority to at this point of time.

As a matter of course, on the contrary, according to some systems, the multi-point control unit may disconnect the lines one-sidedly by forcing the point-to-point connection.

A multi-point teleconference system of the fifth aspect of the present invention is characterized in that the multi-point control unit of the fourth aspect of the present invention can be allocated for use in a new conference when the lines are disconnected by the circuit disconnection means; thus the multi-point control unit can open a new teleconference at one completion of the teleconference, thereby constituting the effective multi-point teleconference system.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

An embodiment of the present invention will be described with reference to the accompanying drawings in detail.

Figure 1:
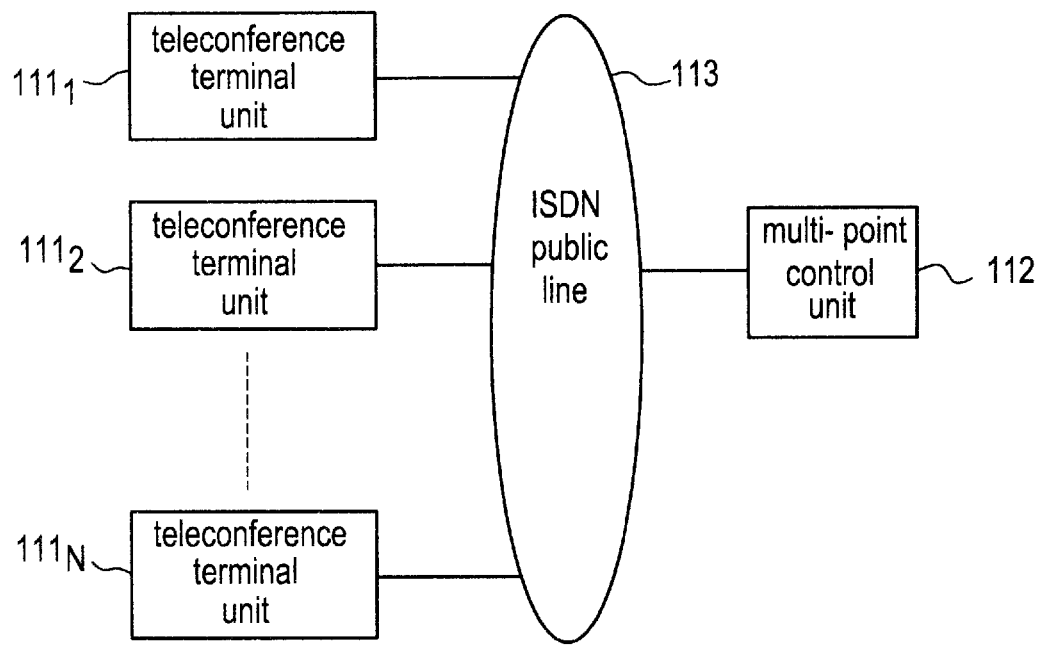
FIG. 1 is a drawing showing a general constitution of a conventional multi-point teleconference system.
Figure 2:
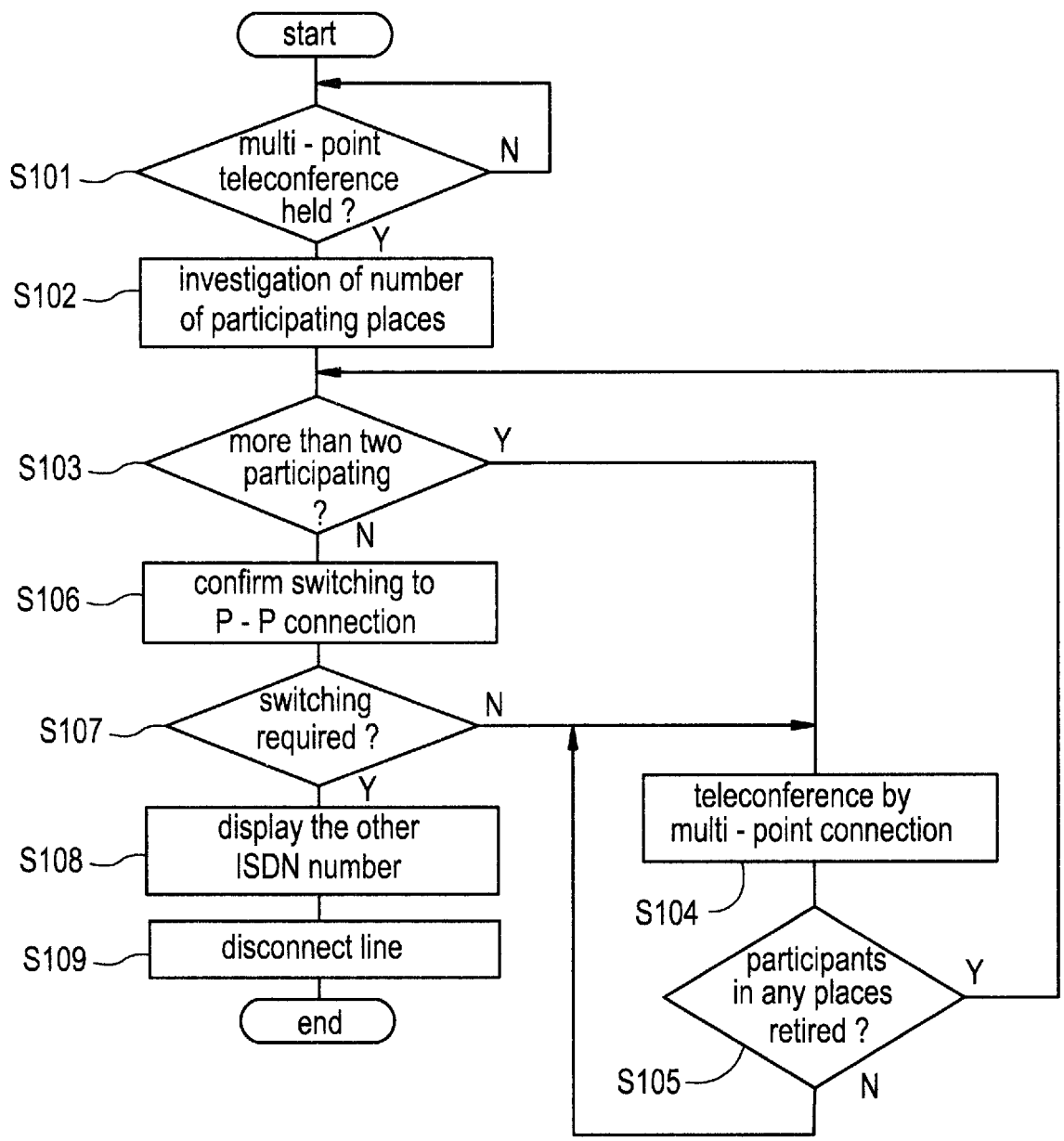
FIG. 2 is a flow chart showing a way of switching control for line connections on the side of the multi-point control unit of the conventional multi-point teleconference system.
Figure 3:
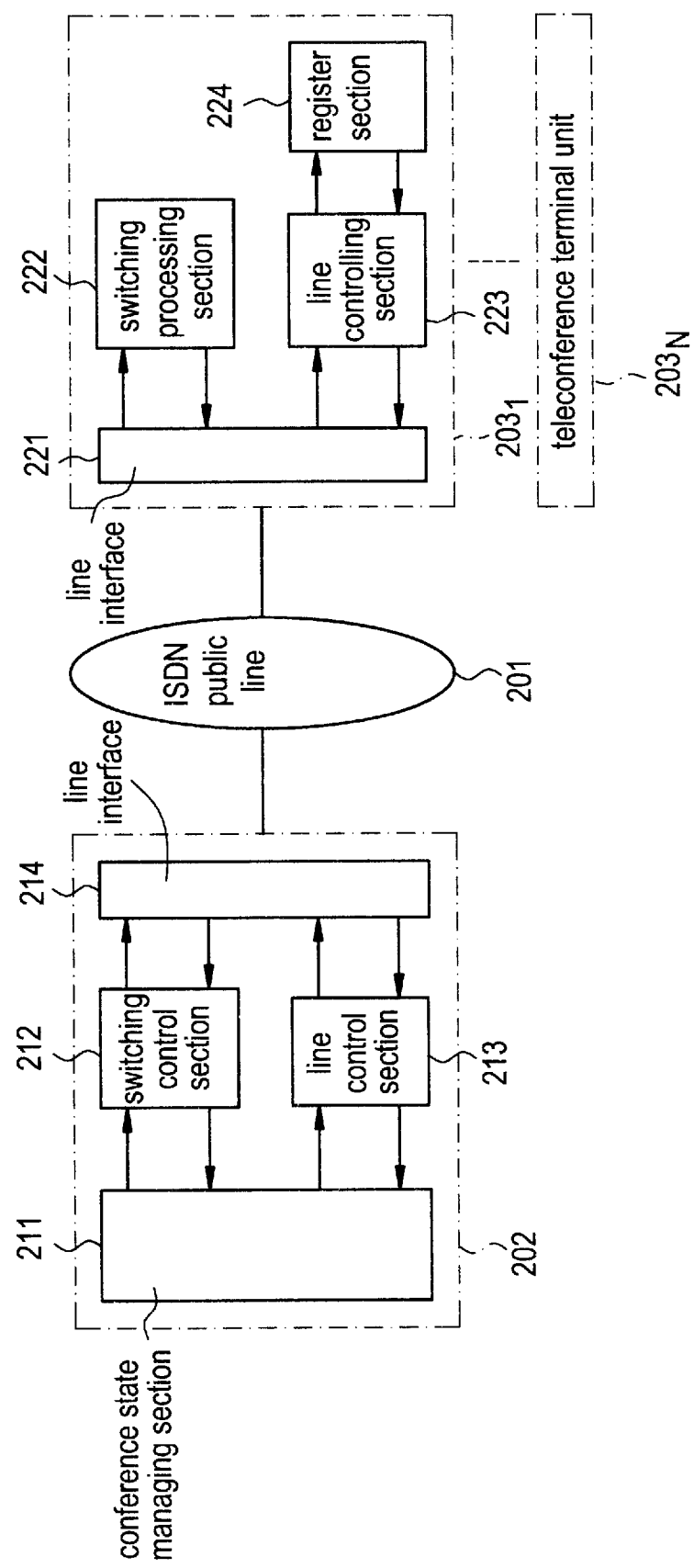
FIG. 3 is a drawing showing an outline of a multi-point teleconference system of an embodiment of the present invention.

FIG. 3 shows a principal part of a multi-point teleconference system of an embodiment of the present invention. The multi-point teleconference system comprises an ISDN public line 201, a multi-point control unit 202 connected to the ISDN public line 201, and teleconference terminal units $203_1, 203_2, \ldots,$ and $203_N$ located in a plurality of places, the units $203_1, 203_2, \ldots,$ and $203_N$ being connected to the ISDN public line 201. Here, the multi-point control unit 202 receives video signals and voice signals from the teleconference terminal units $203_1, 203_2, \ldots,$ and $203_N$ to process them, and then sends these processed signals to the teleconference terminal units $203_1, 203_2, \ldots,$ and $203_N$ to inform participants in the conference about the real state thereof by images and voices. Each of the teleconference terminal units $203_1, 203_2, \ldots,$ and $203_N$ comprises an input apparatus (not shown) which receives images and voices and an output apparatus (not shown) which outputs videos and voices. Each of the teleconference terminal units $203_1, 203_2, \ldots,$ and $203_N$ transmits videos and voices of a speaker to the multi-point control unit 202 and outputs the videos and the voices sent from the unit 203 using a television.

In FIG. 3, the circuit main portions required to explain the line control when the number of the participants in the teleconference changes are shown. The multi-point control unit 202 comprises a conference state managing section 211 for managing the state of the conference. The conference state managing section 211 registers the ISDN numbers of the teleconference terminal units $203_1, 203_2, \ldots,$ and $203_N$ sent from them at the time of line connections, and counts the number of the teleconference terminal units $203_1, 203_2, \ldots,$ and $203_N$ which participate in the conference. At the same time, when there are persons who retire from the conference, the conference state managing section 211 manages the mode change of the conference. A switching control section 212 controls switching of the lines when the number of the connected places has varied. A line control section 213 performs processing for connections and disconnections of the lines when the conference is held. A line interface 214 is a circuit to serve as an interface between each portion of the multi-point control units 202 and the ISDN public line 201.

On the other hand, the first teleconference terminal unit $203_1$ comprises a line interface 221 serving as an interface between the ISDN public line 201 and the circuit portions in the unit $203_1$; a switching processing section 222 connected to the line interface 221, the switching processing section 222 controlling switching the lines; a line controlling section 223 for performing processing for the connections and disconnections of the lines; and a register section 224 connected to the line controlling section 223, the register section 224 registering the ISDN number. Circuit constitutions of the second to N-th teleconference terminal units $203_1, 203_2, \ldots,$ and $203_N$ are the same as that of the first teleconference terminal unit $203_1$, and concrete illustrations for them are omitted.

It should be noted that a central processing unit (CPU: not shown) is built in each of the multi-point control unit 202 as well as the first to N-th teleconference terminal units $203_1, 203_2, \ldots,$ and $203_N$ and various kinds of controlling as to the teleconference and the line connections are performed based on a control program stored in a storage medium (not shown) such as a read only memory (ROM) and a magnetic disk.

Figure 4:
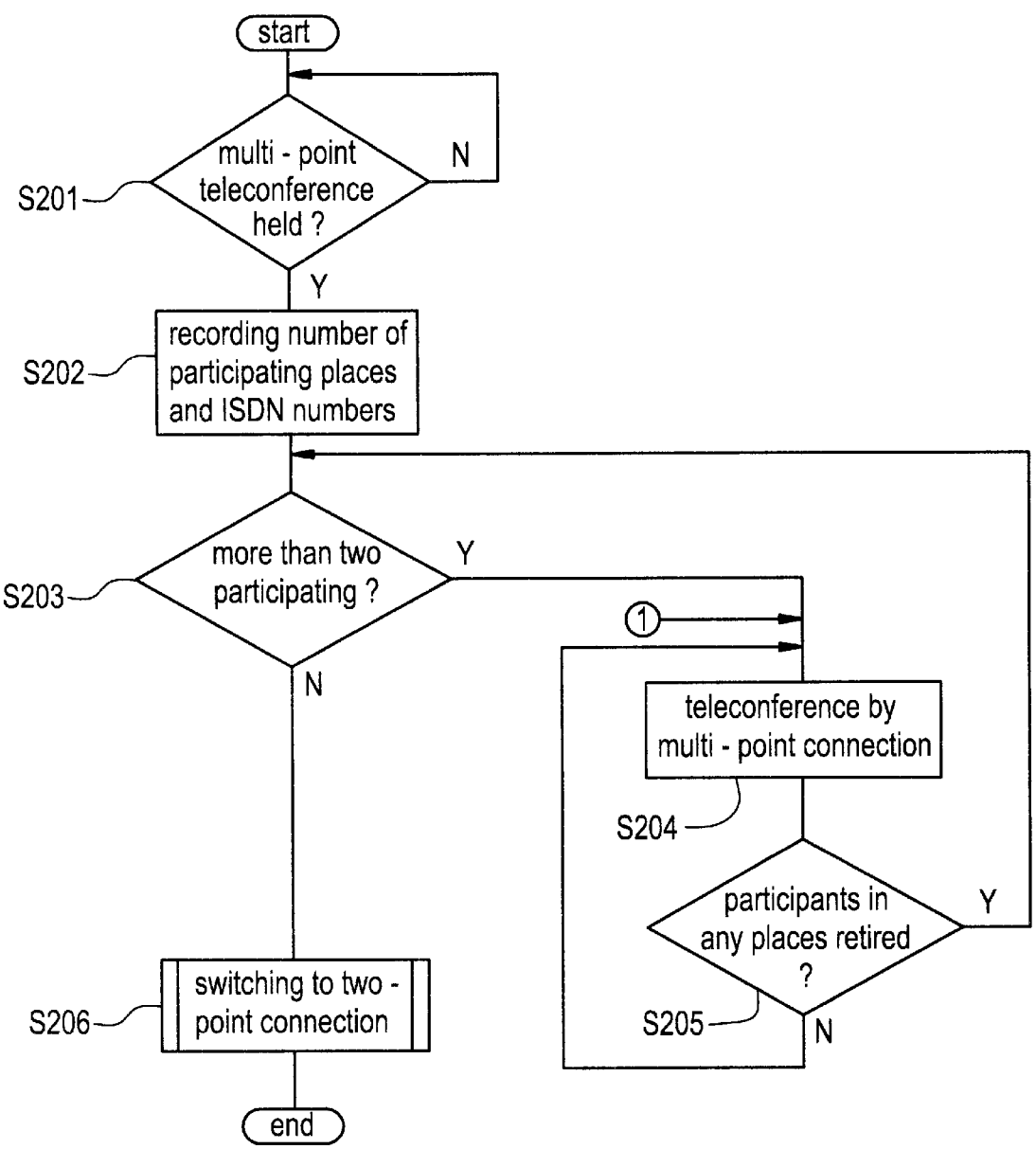
FIG. 4 is a flow chart showing a way of switching line connections on the side of the multi-point control unit of the embodiment of the present invention.

FIG. 4 shows a flow chart showing procedures to control switching of the line connections on the side of the multi-point teleconference system of this embodiment. As soon as the multi-point teleconference starts by signal sending operations of the plurality of teleconference terminal units $203_1$ to $203_N$ (step S201; Yes), the multi-point control unit 202 investigates the number of places which participate in the teleconference, and records the ISDN numbers of the teleconference terminal units $203_1$ to $203_N$ in the RAM (not shown) which have been sent from the units $203_1$ to $203_N$ by the above described signal sending operations (step S202). The number of the places participating in the conference are found by investigating how many teleconference terminal units $203_1$ to $203_N$ performed the signal sending operations to the multi-point control unit 202 and the line connection operations, in order to participate in the conference. As a result, when more than two teleconference terminal units $203_1$ to $203_N$ performed the line connection operations (step S203; Yes), the teleconference by the multi-point connection is begun (step S204).

The multi-point control unit 202 monitors whether retirement of any participant from the conference occurs during the conference (step S205). This monitoring is carried out according to the following method, for example; Specifically, the multi-point control unit 202 watches the control of switching the image by means of the voice, thereby finding out the number of the places where the speech is being made. As long as no participant retires from the conference, the teleconference in the form of the multi-point connection is continued (step S204). If any one of the participants retires during the conference (step S205; Yes), it is checked whether the number of the remaining places participating in the conference is three or more (step S203). While the number of the places participating in the conference is three or more (Yes), the process returns to the step S204, so that the teleconference by the multi-point connection is continued.

On the contrary, when the number of the places participating in the conference reduces to two due to the retirement of the participants from the conference (step S203; No), a switching control from the conference by the multi-point connection to that by a two-point connection is executed (step S206).

Figure 5:
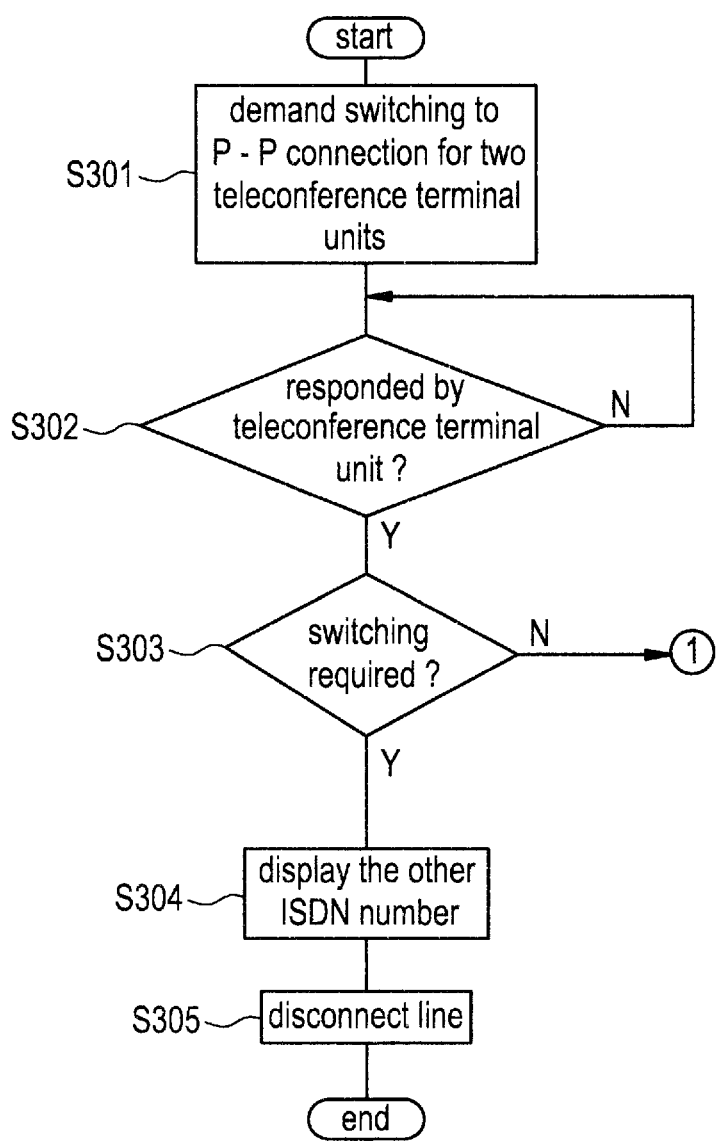
FIG. 5 is a flow chart concretely showing a flow of switching control executed on the side of the multi-point control unit when the number of places participating in a teleconference reduces to two in the embodiment.

FIG. 5 is a flow chart showing concrete procedures of the switching control executed on the side of the multi-point control unit 202 when the number of the places participating in the conference reduces to two. First, at this time, the multi-point control unit 202 demands that two teleconference terminal units which continue the conference should switch to a P—P connection (step S301), the two teleconference terminal units being located in two places and connected to the multi-point control unit 202 by lines. Here, one teleconference terminal unit shall be first teleconference terminal unit $203_1$ and the other teleconference terminal unit shall be the N-th teleconference terminal unit $203_N$. This demand is performed by displaying characters meaning the purport on televisions of the first and N-th teleconference terminal units $203_1$ and $203_N$ and, at the same time, by alarming by sound, for example.

Thereafter, the multi-point control unit 202 waits responses from the first and N-th teleconference terminal units $203_1$ and $203_N$ (step S302). As the result, when the responses from both of the first and N-th teleconference terminal units $203_1$ and $203_N$ requiring the switching from the multi-point connection to the P—P connection, are made (step S302; Yes), the procedures for the P—P connection are begun. Specifically, respective ISDN numbers of the first and N-th teleconference terminal units $203_1$ and $203_N$ are informed to the other teleconference terminal unit (step S304) and registered in the respective registered sections 224. However, depending on types of the system, the ISDN number of one teleconference terminal unit may be informed either to the other teleconference terminal unit which first acknowledged the switching to the P—P connection or to that which finally acknowledged it. Alternatively, the ISDN number may be informed only to one teleconference terminal unit according to predetermined priority.

When the ISDN numbers are informed, each of the first and N-th teleconference terminal units $203_1$ and $203_N$ will register it in its register section 224. After informing the ISDN number, the multi-point control unit 202 disconnects the lines connected to the first and N-th conference terminal units $203_1$ and $203_N$ thereby completing the processing (step S305). On the contrary, when at least one of the teleconference terminal unit $203_1$ and $203_N$ made a response, at the step S303, indicating that switching to the P—P connection is unnecessary (No), a step advances to S204, and the teleconference in the style of the multi-point connection is continued. This is because priority is given to the conveniences of the persons concerned.

Figure 6:
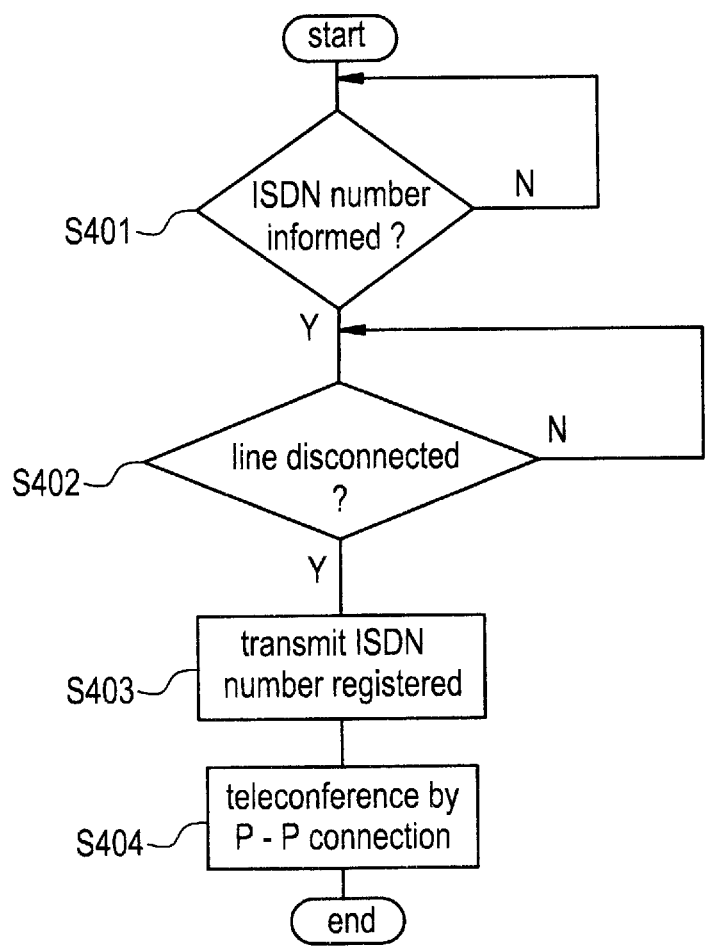
FIG. 6 is a flow chart showing a principal flow of controlling on the side of the teleconference terminal unit of the embodiment.

FIG. 6 is a flow chart showing a principal part of the control operation by the teleconference terminal units. When respective ISDN numbers of the first and N-th teleconference terminal units $203_1$ and $203_N$ are informed to the other teleconference terminal unit in the step S304 of FIG. 5 (step S401; Yes), both teleconference units $203_1$ and $203_N$ wait a disconnection of the lines by the multi-point control unit 202 (step S402). At the time of the disconnection, each of the first and N-the teleconference terminal units $203_1$ and $203_N$ automatically performs a transmission of the ISDN number of the other teleconference terminal unit which is registered in its register section 224 (step S403). When the P—P connection to the other place of the teleconference is established, the teleconference will be continued (step S404). In the case where the multi-point control unit 202 informs the ISDN numbers of both of the teleconference terminal units $203_1$ and $203_N$, each of the teleconference terminal units $203_1$ and $203_N$ performs a transmission of the ISDN number of the other teleconference terminal unit. However, since a teleconference is begun by connecting the line for the preceding transmission, no problem due to this occurs.

In the above-described embodiment, the description was made for the case where the ISDN line is used for the multi-point teleconference system. As a matter of course, other kinds of lines may be well used to perform the similar controlling.

As described above, according to the first aspect of the present invention, in the multi-point teleconference system in the style which is begun by individual connection of the multi-point control unit to the teleconference terminal units, the number decision means checks the temporal change of the number of the teleconference terminal units which participate in the teleconference. When the number of the teleconference terminal units becomes two, the P—P connection is automatically made between these two teleconference terminal units. Therefore, the burden of the multi-point control unit is reduced and shortening of the time until a new teleconference can be achieved.

According to the second aspect of the present invention, when the number of the teleconference terminal units participating in the teleconference reduces to two, the P—P connection is made. The fee paid in the prior art for use of the line can be suppressed to one-half, resulting in reducing the cost of the conference. According to the third aspect of the present invention, since the P—P connection request means is designed to inform the telephone number of one teleconference terminal unit of the teleconference to the other teleconference terminal unit, the telephone number being needed for beginning the P—P connection, the teleconference terminal unit is not required to investigate the phone number of the other teleconference terminal unit, so that an interruption time of the conference can be minimized.

According to the fourth aspect of the present invention, provided is the line disconnection means which disconnects the lines between the multi-point control unit and the two teleconference terminal units which have acknowledged the P—P connection, after the P—P connection means demanded the P—P connection. Therefore, the conference style will not be switched to the P—P connection in the case when even one person opposes the change of a conference style who can anticipates the end of the conference. Therefore, the circumstances of the respective teleconference terminal units can be considered fully.

According to the fifth aspect of the present invention, when the multi-point control unit finishes one teleconference earlier, a new teleconference can be opened at once. This results in establishment of an effective multi-point conference system and in a reduction in cost of the system.

What is claimed is:

1. A multi-point teleconference system which performs a teleconference using televisions by connecting participants in the teleconference existing in a plurality of places comprising:

teleconference opening means for connecting each of a plurality of teleconference terminal units to a multi-point control unit by lines, thereby opening a conference using televisions among said teleconference terminal units located in said places, the multi-point control unit receiving voices and images of a plurality of participants in said conference and supplying the voices and the images required for said participants in said conference to the participants;

number decision means for checking a temporal change of the number of said teleconference terminal units participating in said conference; and teleconference style changing means for allowing two teleconference terminal units to be automatically connected without interposing said multi-point control unit, when the number of said teleconference terminal units continuing the teleconference becomes two.

2. The multi-point teleconference system according to claim 1, wherein said teleconference style changing means comprises point-to-point connection request means for requesting said two teleconference terminal units to perform a teleconference therebetween by directly connecting them with the line by means of a point-to-point connection when the number of the teleconference terminal units checked by said number decision means becomes two.

3. The multi-point teleconference system according to claim 2, wherein said point-to-point connection request means informs at least one of said two teleconference terminal units of a phone number of the other teleconference terminal unit, the phone number being necessary when a point-to-point-connection is made.

4. The multi-point teleconference system according to claim 3, said system further comprising:

circuit disconnection means for disconnecting the lines between said two teleconference terminal units and said multi-point control unit when both of said two teleconference terminal units have acknowledged said point-to-point connection, after said point-to-point connection requested means requests said point-to-point connection.

5. The multi-point teleconference system according to claim 4, wherein said multi-point control unit can be allocated for use in a new teleconference when the lines are disconnected by said circuit disconnection means.

* * * * *